(12) United States Patent
Kayat et al.

(10) Patent No.: US 8,657,897 B2
(45) Date of Patent: Feb. 25, 2014

(54) WET GAS SEPARATOR

(76) Inventors: Zainab Kayat, Selangor (MY); Adam T. Lee, Dallas, TX (US); Farzad G. Tahmassi, Carrollton, TX (US); Zakariah Bin Kasah, Terengganu (MY); Hasni B. Haron, Selangor (MY)

( * ) Notice: Subject to any disclaimer, the term of this patent is extended or adjusted under 35 U.S.C. 154(b) by 35 days.

(21) Appl. No.: 13/002,125

(22) PCT Filed: Jun. 29, 2009

(86) PCT No.: PCT/MY2009/000089
§ 371 (c)(1),
(2), (4) Date: Apr. 28, 2011

(87) PCT Pub. No.: WO2010/002238
PCT Pub. Date: Jan. 7, 2010

(65) Prior Publication Data
US 2011/0209446 A1      Sep. 1, 2011

(30) Foreign Application Priority Data

Jun. 30, 2008   (MY) .............................. PI 20082404

(51) Int. Cl.
*B01D 50/00* (2006.01)
(52) U.S. Cl.
USPC ................... 55/337; 55/322; 55/338; 55/457; 55/466; 55/348; 55/342; 55/343; 55/440; 55/441; 55/442; 55/444; 55/443; 55/445; 55/464; 55/465; 55/434; 95/284; 95/243; 96/356; 96/358
(58) Field of Classification Search
USPC ........... 55/337, 322, 338, 457, 466, 348, 320, 55/323, 349, 342–343, 440–446, 464–465, 55/434, 482, 486–487; 95/284, 243; 96/356, 358
See application file for complete search history.

(56) References Cited

U.S. PATENT DOCUMENTS

| | | |
|---|---|---|
| 3,212,232 A | 10/1965 | McMinn |
| 3,997,303 A | 12/1976 | Newton |
| 4,316,728 A | 2/1982 | Caesar |
| 4,359,329 A | 11/1982 | Willeitner |
| 4,617,031 A | 10/1986 | Suh et al. |
| 4,698,138 A | 10/1987 | Silvey |
| 4,767,424 A * | 8/1988 | McEwan ........................ 55/329 |
| 5,464,459 A * | 11/1995 | VanBuskirk et al. ........... 96/356 |

(Continued)

OTHER PUBLICATIONS

International Search Report and Written Opinion dated Sep. 25, 2009 for PCT Application No. PCT/MY2009/000089. 15716411 070113.

*Primary Examiner* — Dung H Bui
(74) *Attorney, Agent, or Firm* — Knobbe, Martens, Olson & Bear LLP

(57) ABSTRACT

A wet gas separator providing superior separation of entrained droplets of liquids in a gas stream when compared with prior art wet gas separators. The wet gas separator of the present invention has a combination of: a gas inlet system with vanes that divide and direct the gas stream very evenly across the cross-sectional area of the inlet portion of the apparatus, a first stage Z-shaped de-entraining device at the upstream side of a wire mesh mist eliminator, and a gas outlet system having cyclones for removal of traces of re-entrained droplets. The apparatus of the present invention has capability of improving processing throughput by 50% when compared with prior art apparatus, with greater de-entrainment efficiency (achieving 99.7% removal of droplets larger than 10 microns in size).

8 Claims, 12 Drawing Sheets

(56) References Cited

U.S. PATENT DOCUMENTS

| | | |
|---|---|---|
| 5,972,171 A | 10/1999 | Ross et al. |
| 6,045,660 A | 4/2000 | Savage et al. |
| 6,048,376 A | 4/2000 | Miller |
| 6,106,592 A | 8/2000 | Paranjpe et al. |
| 6,451,093 B1 | 9/2002 | Miles |
| 6,599,348 B2 | 7/2003 | Chosnek et al. |
| 6,691,428 B1 | 2/2004 | Zarif |
| 6,964,699 B1 | 11/2005 | Carns et al. |
| 7,025,808 B2 | 4/2006 | Huber et al. |
| 7,074,979 B2 | 7/2006 | Van Egmond et al. |
| 7,279,020 B2 | 10/2007 | Christiansen et al. |
| 7,306,639 B2 | 12/2007 | Wydra et al. |
| 2004/0065110 A1* | 4/2004 | Barratt et al. .................. 62/471 |

* cited by examiner

WET GAS SEPARATOR

CROSS-REFERENCE TO RELATED APPLICATIONS

This application is a filing under 35 U.S.C. §371 based on PCT/MY2009/000089, filed on Jun. 29, 2009, which claims priority to Malaysian Application Serial No. PI 20082404, filed on Jun. 30, 2008, each of which applications are incorporated herein in their entirety.

FIELD OF THE INVENTION

The present invention relates to a wet gas separator for removal of entrained droplets of liquid from a gas stream. In particular, the efficacy of the wet gas separator is improved through installing one or more of a gas inlet device that divides and directs the inlet stream, a first stage Z-shaped de-entraining device at the upstream side of an existing wire mesh mist eliminator, and a gas outlet system having two cyclones.

BACKGROUND

In several processes for manufacturing chemicals or for processing materials gas streams are produced that are subject to entrainment of droplets of liquid carried over from prior processing, for example droplets of water or liquid hydrocarbons. Entrained droplets of small size are referred to as mist. The streams containing entrained droplets are termed wet gas. Frequently, it is desirable to remove entrained liquid as it will adversely affect further processing of the gas stream. In these cases it necessary to remove the entrained droplets, one method for which is to use a wet gas separator. Such a process also may be termed de-entraining, entrainment separation or demisting.

Several designs are known for separation of entrained droplets of liquid from gas streams. A wet gas separator typically uses a contact system to cause the entrained droplets to accumulate into a stream of liquid that is separate from the gas stream. Frequently, the liquid droplets are treated as particulate matter, and removed using filters, cyclones and other means, as outlined for example by de Nevers in "Air Pollution Control Engineering" $2^{nd}$ Edition, McGraw Hill (2000), pages 414-415. When a cyclone is used, the liquid droplets are driven centripetally to accumulate at the outer wall of the cyclone and coalesce. A simple system for effecting contact between droplets and coalescence is a wire mesh mist eliminator, for example for collection of sulfuric acid mists, performance of which is in Section 4.4.4 of "Handbook of Environmental Control—Volume 1: Air Pollution" Edited by Bond et al., CRC Press. (1972). The liquid droplets of the mist contact the mesh and combine there to form an extended liquid mass which then falls under gravity toward a drain for removal.

Mesh-based demisters can be vertically or horizontally oriented. When the apparatus is vertical the mesh is horizontal or inclined, and the accumulated liquid flows downward to a bottom drain, as described by, for example, Carns et al. in U.S. Pat. No. 6,964,699 (2005). Some separators have a plurality of components to effect good liquid-gas separation, as described by Van Egmond et al. in U.S. Pat. No. 7,074,979 (2006), and may rely at least in part with partial flooding of the apparatus so that the droplets contact bulk liquid as described by, for example, Van Egmond in '979 and by Ross et al. in U.S. Pat. No. 5,972,171 (1999). Force of flow may be used to cause droplets to contact contiguous surfaces while gas passes relatively unhindered through successive changes in direction in a de-entrainment chimney, and such impingement effects coalescence of the droplets, as described by, for example, Chosnek et al. in U.S. Pat. No. 6,599,348 (2003), Silvey in U.S. Pat. No. 4,698,138 (1987), Caesar in U.S. Pat. No. 4,316,728 (1982).

Baffles, too, may be situated at different angles to effect droplet separations, as described for recovery of oil from oil-gas mixtures by Miller in U.S. Pat. No. 6,048,376 (2000).

Centripetal forces are used to cause droplet-surface contacts in a centripetal demister described by Miles in U.S. Pat. No. 6,451,093 (2002).

Cyclone systems may operate with the rotation of gas conventionally about a vertical axis or about a horizontal axis, as described by Suh et al. in U.S. Pat. No. 4,617,031 (1986). A combination of rapid depressurizing and cyclonic action is used in a demisting chamber with elbow strainer described by Wydra et al. in U.S. Pat. No. 7,306,639 (2007). A combination of cyclonic action and wall contact arising from a sudden change in gas flow direction is described by Zarif in U.S. Pat. No. 6,691,428 (2004).

Different types of separator may be combined within one apparatus, as described by Huber et al. in U.S. Pat. No. 7,025,808 (2006) and Savage et al. in U.S. Pat. No. 6,045,660 (2000).

Wet electrostatic precipitators also may be used to remove droplets as described by, for example, Paranjpe et al. in U.S. Pat. No. 6,106,592 (2000).

It has been found that, for some processes under a variety of conditions, present equipment is subject to breakthrough of liquids into the effluent gas stream. The breakthrough occurring with some designs may be caused by re-entrainment of the collected liquid. Thus it is advantageous to capture re-entrained liquids. What is needed is a wet gas separator having better capability for separation of entrained liquid and re-entrained droplets, thereby preventing liquid breakthrough. The present invention achieves this goal through an improved design having one or more of a vaned inlet by which flow patterns within the separator are amended, an droplet removal system having improved capability to de-entrain droplets, and an exit system with which the exhaust stream can be fined.

SUMMARY

The present invention relates to an improved design for a wet gas separator having superior capability than conventional separators for removal of liquid droplets from wet gas streams. In particular, the present invention is useful for de-entrainment of liquid hydrocarbon droplets from gas. Improved performance is achieved through use of a gas inlet system that better directs the gas stream in slices, a modified mist elimination internals having a first stage Z-shaped de-entraining device at the upstream side of an existing wire mesh mist eliminator, and a modified gas outlet system including cyclones.

DESCRIPTION OF THE DRAWINGS

For a more complete understanding of the present invention and for further objects and advantages thereof, reference is made to the following description taken in conjunction with the accompanying drawings.

DETAILED DESCRIPTION

An exemplary embodiment of the invention, which is non-limiting, will now be described with reference to FIG. 1 through FIG. 10.

Figure 1:
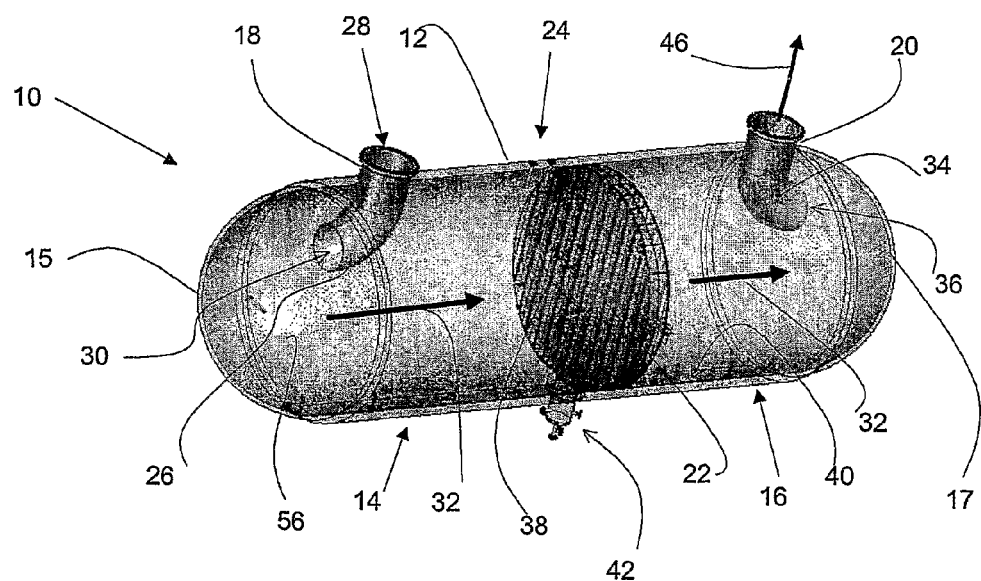
FIG. 1, labeled Prior Art, is a perspective diagram of a demister.
Figure 2:
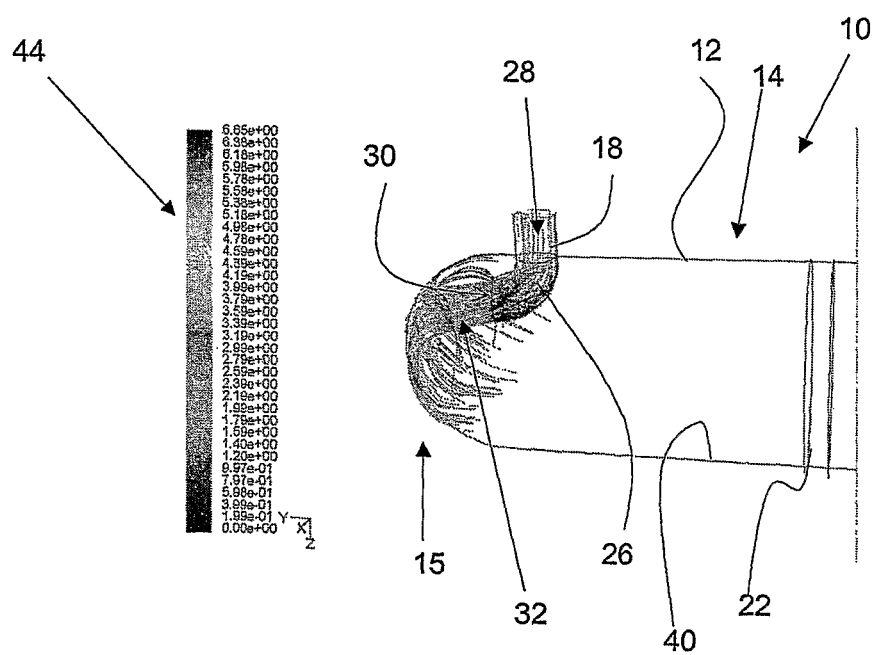
FIG. 2 is a side view illustrating the complexity of flow patterns from the inlet line into the inlet compartment of the demister shown in FIG. 1 and flow rates.
Figure 3:
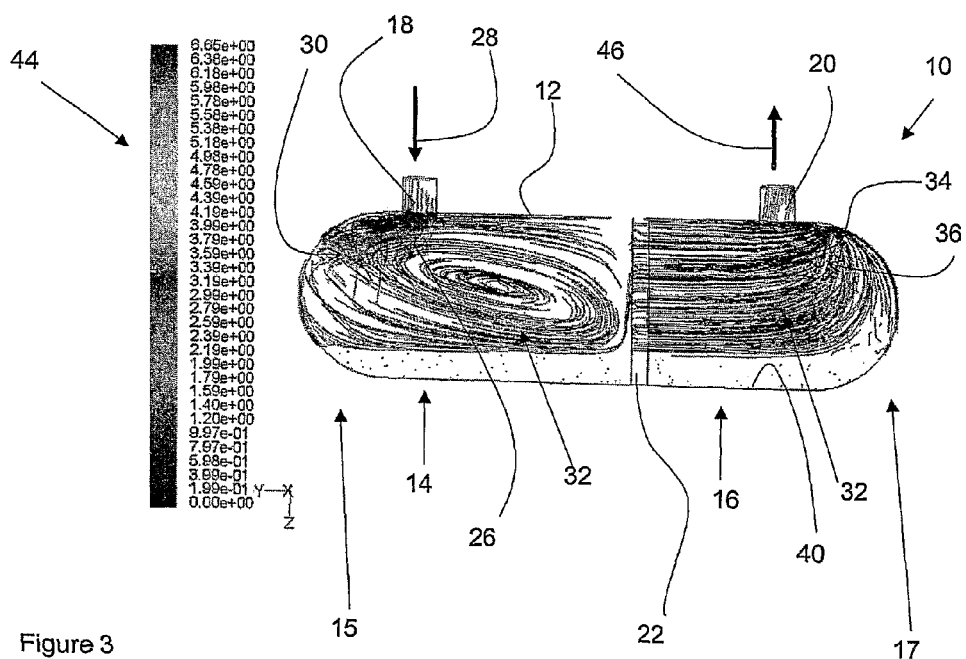
FIG. 3 is a side view illustrating flow patterns and rates in the demister shown in FIG. 1.

Referring to FIG. 1, labeled Prior Art, a conventional wet gas separator 10 comprises a cylindrical body 12 having an inlet compartment 14, an outlet compartment 16, an inlet line 18 and an outlet line 20. A mesh 22 extends across a central portion 24 of body 12. Inlet line 18 has a curved portion 26 within interior of body 12, curved portion 26 oriented so that incoming wet gas 28 is directed from exit 30 toward an end 15 of inlet compartment 14, as illustrated in FIG. 2. In this embodiment of wet gas separator 10 curved portion 26 curves through an angle of about 90 degrees. A gas stream, indicated by arrows 32, then passes from inlet compartment end 15 through mesh 22 toward an end 17 of outlet compartment 16. Arrows 32 are shown as straight in FIG. 1, however the flow pattern is in fact complex, having different flow rates shown as a scale 44, as illustrated in FIGS. 2 and 3. Outlet line 20 has a curved portion 34 within interior of body 12, said curved portion 34 oriented so that an entrance 36 to outlet line 20 faces outlet compartment end 17, and gas stream 32 enters outlet line 20 as shown in FIG. 3. In this embodiment of wet gas separator 10 curved portion 34 curves through an angle of about 90 degrees. Referring again to FIG. 1, as gas stream 32 passes through mesh 22 the entrained liquid droplets impinge upon mesh 22, and liquid 38 accumulated on said mesh 22, and these coalesce. Liquid 38 so formed flows down mesh 22 toward floor 40 and a liquids drain ("boot") 42 from which said liquid is removed from wet gas separator 10. Demisted gas 46 then exits via outlet line 20.

Figure 4A:
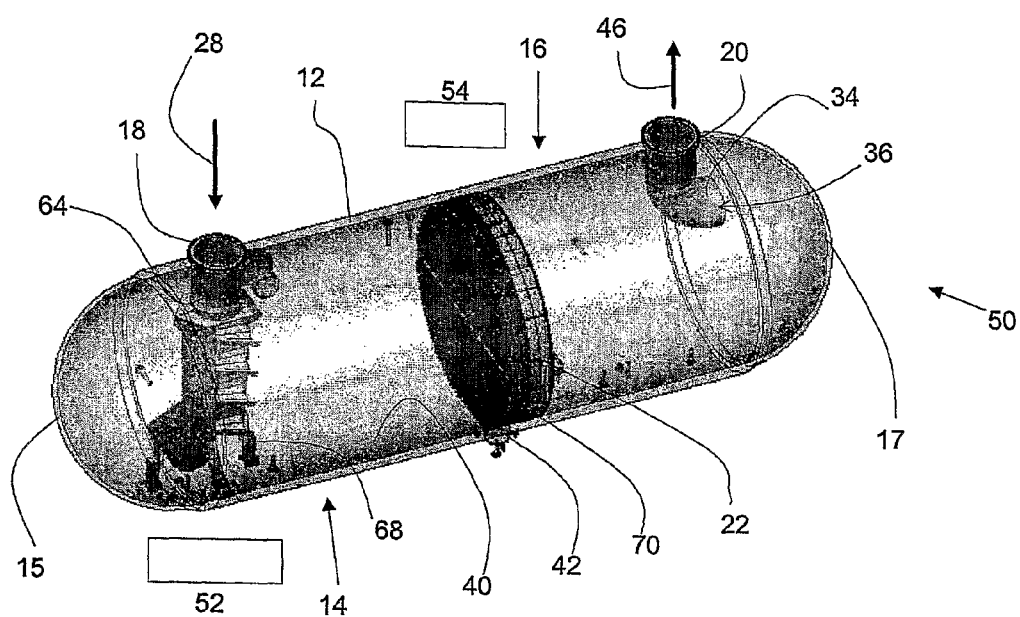
FIG. 4A is a perspective drawing of a first embodiment of a wet gas separator, according to the present invention, having a modified inlet system and a modified mist elimination internals.
Figure 4B:
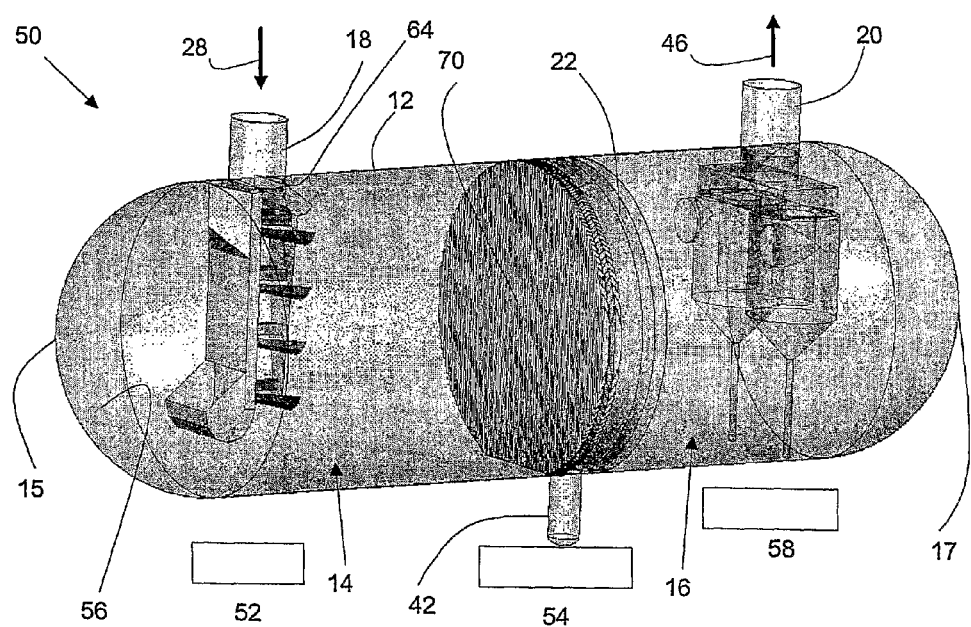
FIG. 4B is a perspective drawing of a second embodiment of a wet gas separator according to the present invention, having a modified inlet system, a modified mist elimination internals, and a modified exit gas system.

Referring to FIGS. 4A and 4B, a first embodiment 50A and a second embodiment 50B of an improved wet gas separator of the present invention, collectively referred to by the reference numeral 50, has at least one of a modified inlet system 52, a modified mist elimination internals 54, and a modified gas outlet system 58. In essence, gas flow within wet gas separator 50 passes four stages of internals from inlet 18 to outlet 20 as follows.

First, gas 28 having entrained droplets of liquid enters through modified inlet system 52. Second, gas 28 passes through a Z-Pack de-entraining device 70. Third, gas 28 passes through vertical mist eliminator 22 which optionally is retained from the design of prior art conventional wet gas separator 10. Fourth, gas 28 passes through gas outlet system that can be one of a conventional gas outlet bend as illustrated in FIGS. 1 and 4A, or, as a preferred option, modified gas outlet system 58 illustrated in FIG. 4B.

Figure 5:
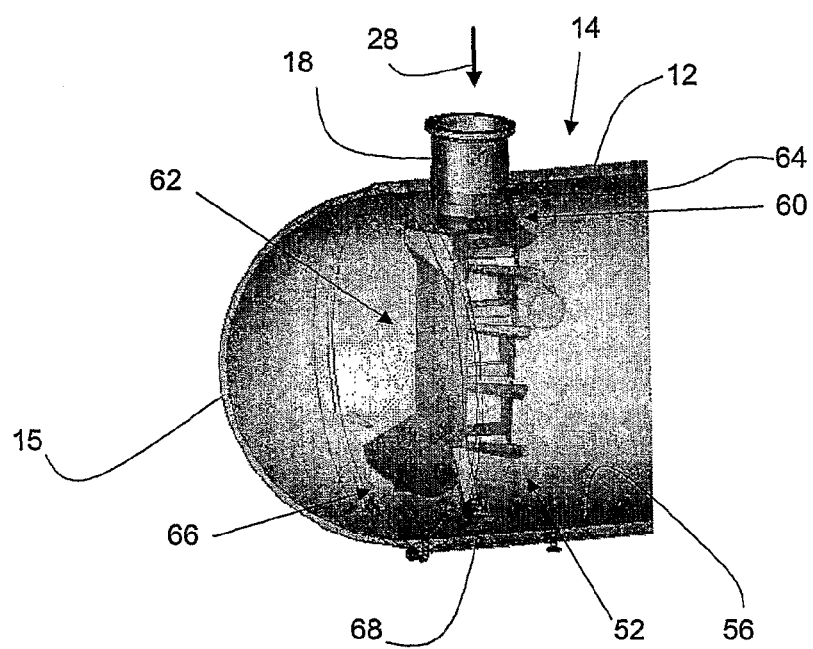
FIG. 5 shows in detail the design of a VDX3-4M inlet device as the inlet system for the wet gas separator shown in FIG. 4.

We have found that good performance of wet gas separator 50 is obtained when inlet device 52 is a VDX3-4M system, illustrated in detail in FIG. 5, as it can offer the following specific functions:

a) Flow Directional Change from the vertically downward direction to the horizontal flow direction toward modified mist elimination internals 54 comprising a combination of Z-Pack de-entraining device 70 and vertical wire mist eliminator 22, with a minimum pressure drop.

b) Momentum Breaker slowing down and diffusing the gas flow to a multiple pre-defined discharge ports without droplet break-up.

c) Gas Distributor using eight specially designed vanes to slice a large portion of the gas flow diverting it toward the mist elimination internals 54. In addition, this employ two scoops (one large and one small) with the large scoop routing a portion of the gas flow passing through the back side of the inlet device in the top of the vessel head along with the contour of vessel wall, and subsequently merging with the lower portion of the gas flow, while using the small scoop to fill up the remaining void spaces near the top of the vessel.

d) Phase Separation: diffused vapor flow makes very low impact to the vessel wall, which allows some droplets to be captured and coalesce to even larger droplets and finally be discharged to the liquid pool below.

We adapted an existing wet gas separator 10 of conventional design, as shown in FIG. 1, to include the above improvements and so construct embodiments of modified wet gas separator 50 shown in FIGS. 4A and 4B. Adapted wet gas separator 50 has 4.4 m ID and is 11 m between inlet tangent and outlet tangent. The dimensions of pre-existing internals (FIG. 1) were: 914 mm diameter inlet bend 26; 440 mm thick vertical mesh pad 22, with wires 80 (FIG. 9) having 0.28 mm diameter and 144 kg/m$^3$ density, located at 6.320 m from the inlet tangent line; and 914 mm diameter outlet bend 34. It will be recognized that dimensions of components will be scaled for use in wet gas separators 10, 50 of different sizes. The existing vertical mist eliminator 22 (York-431 in 304 SS) with a total thickness of 440 mm is a standard knitted mesh pad.

Figure 6:
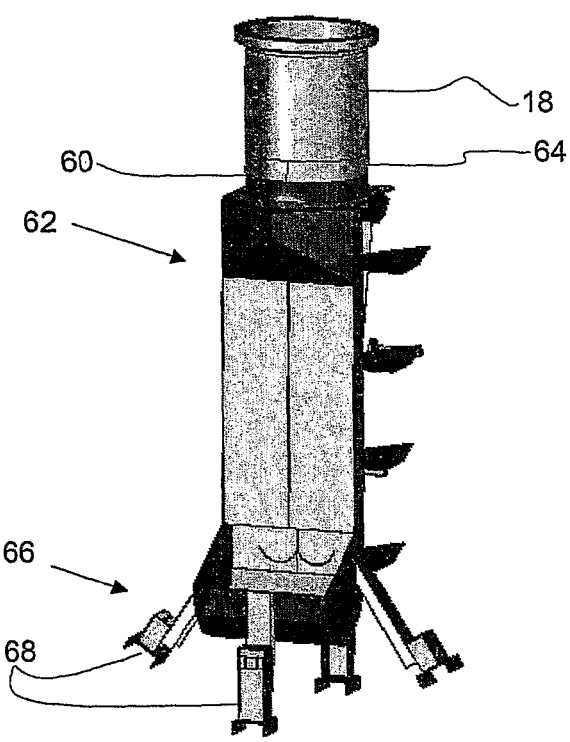
FIG. 6 shows mounting of housing for inlet device VDX3-4M in the body of a wet gas separator.

Modified inlet device 52 may be suspended from a remaining inlet nozzle projection 64 of wet gas separator 50, as illustrated in FIG. 4. Alternatively, to improve physical integrity throughout extended lifetime, inlet device 52 also is supported on at least one support leg 68 attached to internal surface 56 of body 12 and a bottom 66 of a housing 62, as illustrated in FIGS. 4A, 5 and 6.

To install inlet device 52 (VDX3-4M) in wet gas separator 10, shown in FIG. 1, inlet bend 26 first is removed approximately 100-125 mm from an interior surface 56 of body 12. Referring to FIG. 6, a top 60 of VDX3-4M housing 62 then is welded to remaining nozzle internal projection 64, while bottom 66 of housing 62 is supported by at least one leg 68; four legs 68 are shown in FIG. 6.

Figure 7:
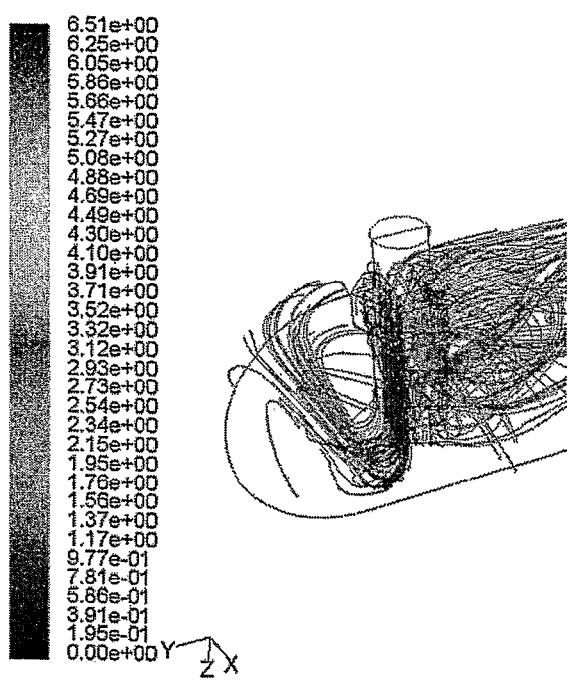
FIG. 7 illustrates the flow patterns of wet gas within inlet compartment of the wet gas separator illustrated in FIG. 5.

FIG. 7 illustrates that the flow patterns within inlet compartment 14 arising from use of inlet device 52 are greatly modified when compared with flow patterns using a conventional inlet line 18 as illustrated in FIG. 2, as determined by CFD modeling.

Figure 8A:
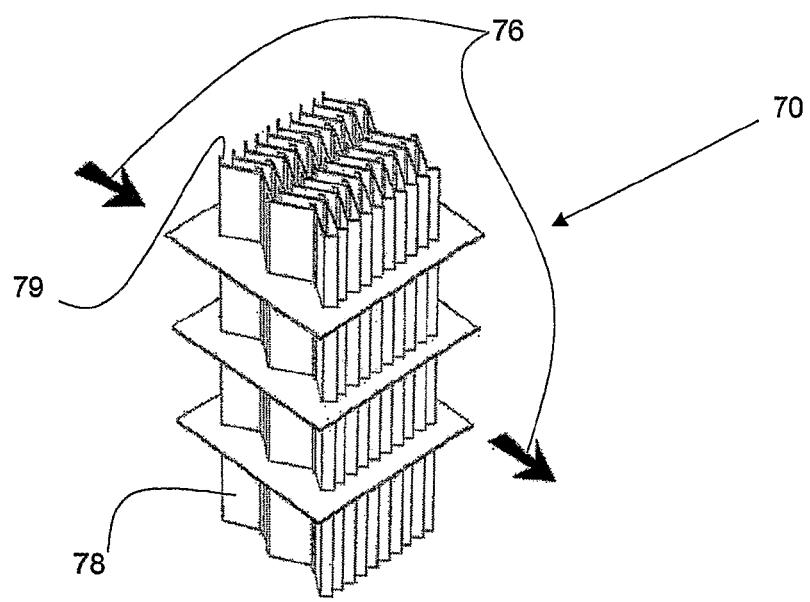
FIG. 8A is a perspective view drawing illustrating internal structure of a Z-Pack de-entraining device.
Figure 8B:
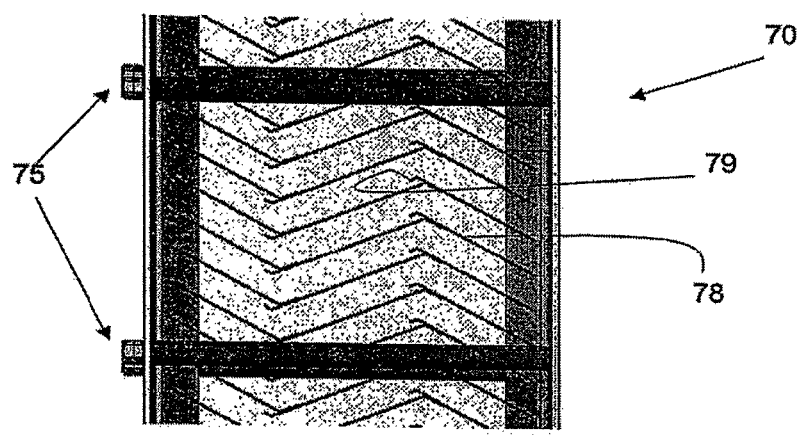
FIG. 8B is a top view drawing illustrating internal structure of a Z-Pack de-entraining device.
Figure 9:
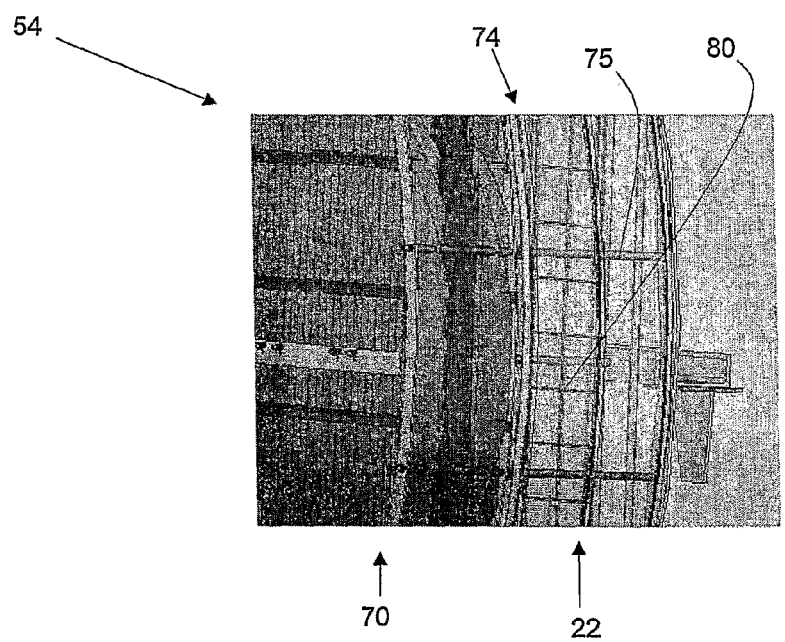
FIG. 9 shows in detail a portion of a modified mist elimination internals according to the present invention.
Figure 10:
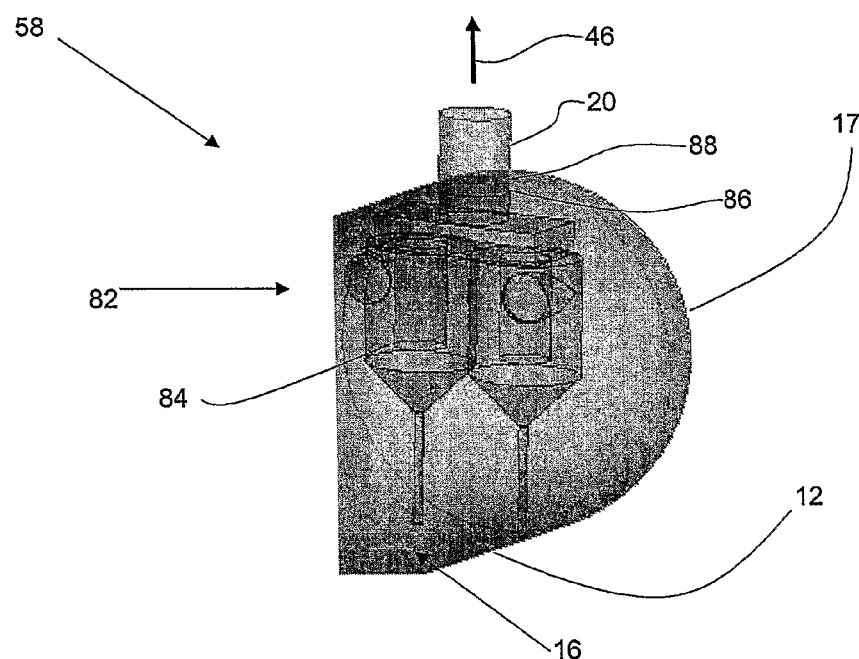
FIG. 10 shows in detail internals of a demister having cyclones for fining of exit gases.

Referring to FIGS. 4A and 4B, there is a minimal pressure drop across the modified mist elimination internals 54 comprising a combination of Z-Pack de-entraining device 70 and vertical wire mist eliminator 22. The structure of Z-Pack de-entraining device 70 is illustrated in FIGS. 8A (perspective view) and 8B (top view). When Z-Pack de-entraining device 70 is installed in conventional wet gas separator 10, device 70 is fastened between two 360° rings 74 and through-bolted 75 to existing demister support ring 22 to form mist eliminator internals 54, a detailed portion of which is shown in FIG. 9. Z-Pack de-entraining device 70 is a vane-type mist eliminator designed specifically for a horizontal gas flow, shown as arrows 76 in FIG. 8A. A plurality of vanes 78 are assembled in custom-designed frames which provide the design vane spacing, gas seals and drain arrangement. The gas passes between parallel sinusoidal vanes 78 fitted with strategically arranged hooks 79. Droplets are separated from gas stream 76 by inertial forces in two stages. Coarse droplets and suspended solid particles are captured at the first hook, while the smaller droplets are captured by the second hook after acceleration through the venturi throat created by the first hook housing. The captured liquid drains down the hooks into the bottom liquid pool, and drains from wet gas separator 50 via drain 42. Z-Pack has high separation efficiency (99.9%) for droplet sizes down to 20 micron diameter at V-0401 gas flow loading conditions (50-130% design rates), as per the design and operating parameters given in Table 1, in Example 1 below. Z-pack de-entraining device 70 offers a first stage of mist elimination to remove a majority of liquid carry-over and thus effectively reduces a load on the downstream mesh pad that is vertical wire mist eliminator 22. Drain 42 for liquid draw is located under mesh pad 22. With the design illustrated in FIG. 9, wire mesh pad 22 is no longer subject to any re-entrainment which may have occurred with the original separator design 10. With near perfect gas distribution and free of droplets equal to or larger than 20 microns and suspended solid particles, existing mesh pad 22 (if not partially plugged and mechanically damaged) is expected to achieve 99.7% removal of 10-micron droplets.

Herein, the designs of the inlet 52 and demister 54 internals have been optimized using CFD modeling of flows, so as to fully utilize separator 50 open space including inlet compartment 14 up to inlet end 15, and to deliver uniform and full coverage of gas flow above a level of liquid at floor 40. Additionally, low impact of the gas stream to the wall interior surface 56 will allow some droplets to be captured and coalesce to larger drops, and finally discharge to the liquid pool below through drain 42. The present embodiments of internals 52, 54 are constructed of 6 millimeter thick stainless steel, however it will be recognized that the selection of materials depends on both the fluids present and the operating conditions. The overall system has a very low pressure drop. The load around internal projection 64 of inlet line 18 by the weight of diffuser 52 is evenly distributed, and new clips also can be used that are welded to the wall of body 12.

With these improvements, the design of Z-Pack de-entraining device 70 allows staged demisting within demister 54, device 70 removing any solid and fouling material, as well as large liquid droplets (≥20 micron), thus unloading downstream wire mesh mist eliminator 22, with the consequences that wire mesh pad 22 will not be subject to flooding, there is enhanced oil/water phase separation, and the pressure drop is no more than 0.5 mm Hg Further improvement in performance can be achieved through modification of gas outlet system 58. Optionally, modified gas outlet system 58 can include an apparatus 82 comprising an outlet double cyclone 84 (FIG. 10), implementation of which increases the unit capacity up to 140% design rate The cyclone system allows further cleanup of any residual entrainment or re-entrainment of droplets, if any. Again, the material used in the present embodiments, 6 millimeter stainless steel, may be replaced for non-conventional applications. The weight of dual-cyclones 84 of outlet device 58 are evenly distributed about circumference of internal projection 86 of outlet line 20. Clips also may be used to provide additional support, which are welded to internal surface 56 of body 12.

Hence superior performance is achieved for wet gas separators for de-entraining droplets of liquids from a gas stream by incorporating one or more of, and preferably all of: installing a gas inlet system that divides and directs the gas stream, to improve gas flow throughout the inlet compartment and thereby improve capture of droplets at the demister; adding a first stage Z-shaped de-entraining device at the upstream side of a wire mesh mist eliminator, thereby reducing the load on the wire mesh demister and so improving droplet capture efficiency; and installing at the outlet compartment a gas outlet system having cyclones for removal of residual or re-entrained droplets. With this invention, we have found that we can achieve-capacity of 50% to 120% design rates and removal efficiency up to 99.7% for droplet size≥10 micron, with an overall pressure drop no greater than 40 mm Hg, thereby attaining excellent gas/liquid separation having total liquid carry-over≤0.2 US gal/MMSCF

EXAMPLE 1

When the above modifications are made, performance of wet gas separator 50 is improved compared to conventional wet gas separator 10 for operation of gas containing entrained droplets of water and/or liquid hydrocarbons, as shown in Table 1.

TABLE 1

Design specifications and performance of one embodiment of a wet gas separator according to the present invention.

| | |
|---|---|
| Operating Pressure | 66.8 Bara |
| Operating Temperature | 26.7 C. |
| Inlet Gas Condition | Flow: 596,000 kg/h |
| | Density: 65.13 kg/m3 |
| | Molecular weight: 19.68 |
| | Viscosity: 0.01 |
| Inlet Liquid Hydrocarbon Condition | Flow: 1,390 kg/h |
| | Density: 575 kg/m3 |
| | Viscosity: 0.121 |
| Inlet Water Condition | Flow: 1,040 kg/h |
| Performance | 1. Separation Efficiency: 99.7% removal of 10 micron liquid droplets. |
| | 2. ≤0.2 US gal/MMSCF gas flow. |
| | 3. Total Pressure Drop: <10 mm Hg (@ 100% design rate) |

What is claimed is:

1. An apparatus for de-entraining liquid droplets from a gas stream, the apparatus comprising:

a vessel having a first inlet end and a second outlet end, and a demister dividing the interior of the vessel into an inlet compartment and an outlet compartment, a gas inlet distributor having a plurality of vanes for dividing and directing, a gas stream entering the inlet compartment from a top of the vessel towards the demister, a first stage chevron type of de-entraining device positioned at an upstream side of the demister, thereby reducing the load on the demister and improving droplet capture efficiency, wherein the outlet compartment includes cyclones for removal of residual or re-entrained droplets from the gas stream, wherein the plurality of vanes are positioned at a forward side of the inlet distributor and face the demister to slice a major portion of the gas stream divert the gas stream from a downward vertical flow to a horizontal flow and sending the gas toward the demister, and two scoops, a larger one positioned at a lower end of a back side of the inlet distributor, and a smaller one located at a top of a forward side of the inlet distributor for routing a remaining portion of the gas stream so as to evenly distribute gas flow across the inlet compartment so that gas distribution is uniform and without recirculation before entering the demister.

2. The apparatus of claim 1, wherein the de-entrained liquid droplets from the gas stream are selected from the group consisting of droplets of water, liquid hydrocarbons, and combinations of water and liquid hydrocarbons.

3. The apparatus of claim 1, wherein the vanes are selected from the group consisting of flat, Z-shaped, and sinusoidal vanes, and combinations thereof.

4. The apparatus of claim 1, wherein the gas stream comprises at least one light hydrocarbon and the de-entrained liquid droplets comprises at least one heavier hydrocarbon.

5. An apparatus for de-entraining liquid droplets from a gas stream comprising:

a vessel having a demister dividing an interior of the vessel into an inlet compartment and outlet compartment, the vessel having a first gas inlet end and a second outlet end;

a gas inlet distributor having a plurality of vanes for dividing and directing a gas stream entering the inlet compartment from a top of the vessel towards the demister;

a gas outlet having cyclones for removal of residual or re-entrained droplets from the gas stream;

wherein the demister comprises a de-entraining device and vertical wire mesh mist eliminator, wherein the de-entering device is located at an upstream side of the wire mesh mist eliminator for reducing a load on the wire mesh eliminator and improving droplet capture efficiency;

wherein the vanes are located at a forward side of the inlet distributor, facing the demister;

wherein the inlet distributor comprises two scoops, wherein a larger scoop is located at a lower end at a back side of the inlet distributor for routing a portion of gas, and a smaller scoop is located at an upper end of a forward side of the inlet distributor for routing a remaining portion of the gas; and wherein the inlet distributor directs the gas stream from a downward vertical direction from the top of the vessel to a horizontal direction towards the demister such that the gas stream in the inlet compartment is evenly distributed without recirculation before entering the demister.

6. An apparatus as claimed in claim 5, wherein the de-entraining device comprises a plurality of sinusoidal vanes fitted with hooks for catching droplets and suspended solid particles, wherein the coarser droplets are caught by first hooks and the smaller droplets are caught by second hooks after acceleration through a venturi throat created by the first hook.

7. An apparatus as claimed in claim 6, wherein the coarser droplets and the smaller droplets follow the hooks into a bottom liquid pool and are drained out of the apparatus via a drain.

8. An apparatus as claimed in claim 5, wherein the gas outlet comprises at least two cyclones to allow higher throughput of the gas stream.

* * * * *